United States Patent [19]

Noland et al.

[11] Patent Number: 5,188,041
[45] Date of Patent: Feb. 23, 1993

[54] APPARATUS AND METHOD FOR LOW TEMPERATURE THERMAL STRIPPING OF VOLATILE ORGANIC COMPOUNDS FROM SOIL AND WASTE MATERIALS WITH NON-OXIDATIVE CO-CURRENT GASES

[75] Inventors: John Noland; Michael Cosmos, both of West Chester, Pa.

[73] Assignee: Roy F. Weston, Inc., West Chester, Pa.

[21] Appl. No.: 812,057

[22] Filed: Dec. 17, 1991

[51] Int. Cl.$^5$ .................... A47J 36/00; A47J 36/24
[52] U.S. Cl. ................... 110/246; 47/1.42; 47/DIG. 10; 110/226; 110/236; 110/346; 405/128
[58] Field of Search ............... 110/226, 229, 246, 346, 110/236; 48/209; 47/1.42, DIG. 10; 405/128

[56] References Cited

U.S. PATENT DOCUMENTS

| | | |
|---|---|---|
| 2,731,241 | 1/1956 | Christian . |
| 3,751,267 | 8/1973 | Sachnik . |
| 4,098,200 | 7/1978 | Dauvergne . |
| 4,139,462 | 2/1979 | Sample, Jr. . |
| 4,167,909 | 9/1979 | Dauvergne . |
| 4,319,410 | 3/1982 | Heilhecker et al. . |
| 4,330,946 | 5/1982 | Courneya . |
| 4,339,999 | 7/1982 | Fio Rito et al. . |
| 4,400,936 | 8/1983 | Evans . |
| 4,411,074 | 10/1983 | Daly . |
| 4,504,222 | 3/1985 | Christian . |
| 4,544,374 | 10/1985 | Mallek et al. . |
| 4,628,828 | 12/1986 | Holtham et al. . |
| 4,738,206 | 4/1988 | Noland . |
| 4,782,625 | 11/1988 | Gerken et al. . |
| 4,864,942 | 9/1989 | Fochtman et al. . |
| 4,875,420 | 10/1989 | Hay et al. . |
| 4,881,473 | 11/1989 | Skinner . |
| 4,919,570 | 4/1990 | Payne . |
| 4,927,293 | 5/1990 | Campbell . |
| 4,947,767 | 8/1990 | Collette ..................... 110/246 X |
| 4,951,417 | 8/1990 | Gerken et al. ............. 110/226 X |
| 4,957,429 | 9/1990 | Mendenhall . |
| 4,974,528 | 12/1990 | Barcell . |
| 4,977,839 | 12/1990 | Fochtman et al. ......... 110/226 X |
| 4,998,848 | 3/1991 | Hansen . |
| 5,011,329 | 4/1991 | Nelson et al. . |
| 5,039,415 | 8/1991 | Smith . |
| 5,052,858 | 10/1991 | Crosby et al. . |
| 5,088,856 | 2/1992 | Yocum . |

FOREIGN PATENT DOCUMENTS

| | | |
|---|---|---|
| 385085 | 9/1990 | European Pat. Off. . |
| 3906006 | 3/1990 | Fed. Rep. of Germany . |

*Primary Examiner*—Edward G. Favors
*Attorney, Agent, or Firm*—Miller & Christenbury

[57] ABSTRACT

A method and apparatus for removing volatile organic contaminants from soil and waste materials including transporting and placing the contaminated material into a hopper, the hopper being substantially sealed from the atmosphere to prevent fugitive emissions of the contaminants from escaping into the atmosphere; conveying the material under substantially sealed conditions into a heated vapor stripping conveyor; conveying material under substantially sealed conditions along the vapor stripping conveyor to heat the material and thereby cause moisture in the material and the contaminants to be stripped from the material; streaming non-oxidizing gases at a controlled temperature over the material, in the direction of travel of the material, beginning at a point downstream of and adjacent to the introduction of the material into the vapor stripping conveyor to carry the contaminants and moisture away from the material; and maintaining the rate of flow and temperature of the gases to prevent undue surface drying of the material as the material passes through the conveyor.

16 Claims, 3 Drawing Sheets

APPARATUS AND METHOD FOR LOW TEMPERATURE THERMAL STRIPPING OF VOLATILE ORGANIC COMPOUNDS FROM SOIL AND WASTE MATERIALS WITH NON-OXIDATIVE CO-CURRENT GASES

BACKGROUND OF THE INVENTION

This invention relates to a method and apparatus for decontaminating soil and waste materials, particularly to a method and apparatus for removing volatile and semivolatile hazardous organic contaminants from soil, municipal, chemical and refinery sludges and other particulate materials.

DISCUSSION OF THE PRIOR ART

With increased environmental awareness and discovery of many landfills, dumps sites and the like containing contaminated soils and waste materials, a number of soil decontamination methods and apparatus have been proposed. These include systems disclosed in U.S. Pat. Nos. 4,738,206, 4,782,625 and 4,864,942. It is vitally important that many of these contaminated areas be freed from hazardous contaminants because of their potential toxicity. Many sites are so close to areas inhabited by humans that direct contact with the soil or waste materials or ingestion of fugitive vapors can be lethal. Also, many sites have the potential to leach hazardous contaminants into ground water supplies, thereby posing further danger. It has accordingly become necessary to develop methods which effectively remove all of the contaminants in a cost efficient manner and dispose of them in an environmentally safe manner.

U.S. Pat. No. 4,738,206, issued to one of the inventors hereof and owned by the assignee hereof, discloses an apparatus and method for removing volatile organic contaminants containing moisture by sealing the soil in a stripping conveyor against contact with air and countercurrently vapor stripping the contaminants at a temperature below the boiling points of the contaminants. This method and apparatus has proven to be quite effective for decontaminating soils in many situations.

U.S. Pat. No. 4,782,625 discloses a mobile decontamination apparatus for removing halogenated hydrocarbons, petroleum hydrocarbon and derivatives of petroleum hydrocarbons from soil. However, this apparatus suffers the severe problem of being open to the environment. Open systems can be quite hazardous and frequently cause difficulties in obtaining proper permitting for operation thereof.

U.S. Pat. No. 4,864,942 discloses a process and apparatus for thermally separating organic contaminants such as PCB's from soils and sludges. This apparatus provides inadequate disposition of vaporized organic contaminants after volatilization from the soils and sludges.

Other prior art known to applicant in completely different areas of endeavor include U.S. Pat. Nos. 2,753,159; 2,731,241; 3,751,267; 4,098,200; 4,139,462; 4,167,909; 4,319,410; 4,330,946; 4,411,074; 4,504,222; 4,544,374; 4,628,828; 4,875,420 and 4,881,473.

OBJECTS OF THE INVENTION

It is an object of the invention to provide a method and apparatus for removing volatile and semivolatile hazardous organic contaminants from soil and sediments.

It is a further object of the invention to provide a method and apparatus for removing volatile and semivolatile hazardous organic contaminants from waste materials such as municipal, refinery and chemical sludges and other particulate wastes.

It is another object of the invention to provide a method and apparatus capable of decontaminating large quantities of natural soil without transporting the soil to remote locations.

It is yet another object of the invention to decontaminate soil in a manner which poses no environmental risk to surrounding areas and is free from danger of explosion of fire.

Other objects and advantages of the invention will become apparent to those skilled in the art from the drawings, the detailed description of preferred embodiments and the appended claims.

SUMMARY OF THE INVENTION

This invention provides a method for removing volatile organic contaminants from soil and waste materials including removing contaminated material to be treated from its existing location, transporting and placing the contaminated material into a hopper wherein the hopper is substantially sealed from the atmosphere to prevent fugitive emissions of the contaminants from escaping into the atmosphere. The contaminated material is then conveyed under sealed conditions into a heated vapor stripping conveyor. The contaminated material is conveyed under sealed conditions along the vapor stripping conveyor to heat the contaminated material and thereby cause moisture in the material and the contaminants to be stripped from the material.

At the same time the contaminated material is conveyed along the vapor stripping conveyor, non-oxidizing gases are concurrently swept along the surface of the material beginning at a point downstream but directly adjacent to the introduction point of the material to carry volatilized contaminants and moisture emanating from the material across and away from the material. The sweep of non-oxidizing gas is maintained at a rate of flow and temperature to prevent undue surface drying of the material as the material passes through the conveyor.

The invention further provides an apparatus for removing volatile organic contaminants from the contaminated material including a hopper, means for sealing the material from atmospheric air, a heated vapor stripping conveyor sealed from the atmospheric air to vapor strip the volatile contaminants from the material and means for conveying the material in a sealed condition from the hopper to the vapor stripping conveyor.

The apparatus further includes means for supplying non-oxidative gases at a temperature greater than ambient to the vapor stripping conveyor, means for introducing the non-oxidative gases into the vapor stripping conveyor beginning at a point downstream but directly adjacent to the introduction point of the material and means for removing the non-oxidative gases from the conveyor located to cause the non-oxidative gases to co-currently sweep over the material to convey volatile contaminants stripped from the material out of the vapor stripping conveyor. The apparatus still further includes means for controlling the flow rate and temperature of the non-oxidative gases as they flow through the vapor stripping conveyor and across the material to prevent undue surface drying of the material as it passes through the vapor stripping conveyor.

DETAILED DESCRIPTION OF THE INVENTION

Figure 1:
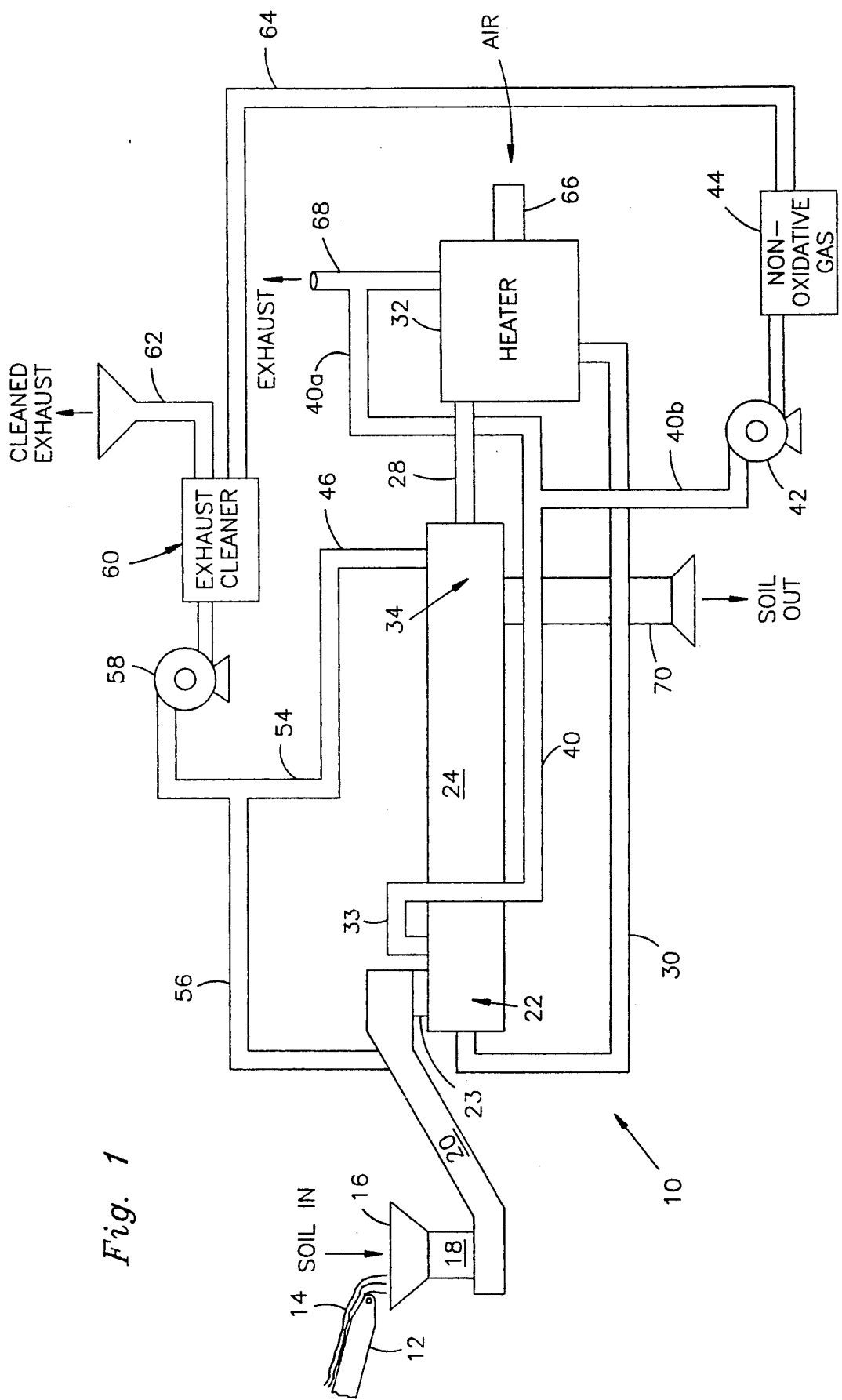
FIG. 1 represents a schematic diagram showing one preferred form according to which the invention may be practiced.

Although a particular form of apparatus and method has been selected for illustration in the drawings, and although specific terms will be used in the specification, for the sake of clarity in describing the apparatus and method steps shown, the scope of this invention is defined in the appended claims and is not intended to be limited either by the drawings selected or the terms used in the specification or abstract. When referring to contaminated soil or waste materials such as municipal, refinery or chemical sludges or waste particulates, waterway and lagoon sediments and the like, the terms "contaminated materials" or "materials" will be used hereinafter for the sake of convenience.

Referring now to the drawings in general and FIG. 1 in particular, one embodiment of a decontamination system 10 is shown. Removing conveyor 12, which may be a conventional belt conveyor, belt conveyor with scoops, front and loader, backhoe or the like, removes contaminated material 14 from the ground and places it in container 16. Container 16 connects to feeder 18, which connects to sealed conveyor 20. Contaminated material 14 travels under sealed condition to the front end 22 of vapor stripping conveyor 24 by way of hopper 23. Vapor stripping conveyor 24 contains a stripping conveyor 26 (see FIG. 2). Stripping conveyor 26 connects to heat transfer fluid supply line 28 and fluid return line 30. Fluid supply line 28 and fluid return line 30 connect to fluid heater 32.

Vapor stripping conveyor 24 has a non-oxidative gas feed line 33 connected downstream of but directly adjacent to the introduction point of sealed conveyor 22 and hopper 23 and channels non-oxidative gasses into vapor stripping conveyor 24. Non-oxidative gas feed line 33 connects to a non-oxidative gas supply line 40, with one branch 40a connecting to heater 32 and another branch 40b connecting to non-oxidative gas supply blower 42. Non-oxidative gas supply pump 42 connects to non-oxidative gas source 44. Valve 43 may be opened or closed to control the rate of non-oxidative gas channelled to blower 42.

The end 34 of vapor stripping conveyor 24 opposite non-oxidative gas feed line 33 has a vapor exhaust line 46 which connects to vapor exhaust manifold 54. Supplemental vapor exhaust conduit 56 extends between sealed conveyor 20 and vapor exhaust manifold 54. Vapor exhaust manifold 54 also connects to vapor exhaust blower 58, which connects to vapor exhaust cleaner apparatus 60. Vapor exhaust cleaner apparatus 60 has exhaust purge conduit 62 and exhaust purge recycle conduit 64 connected downstream. Exhaust purge recycle conduit 64 connects to non-oxidative gas supply 44. Heater 32 has air intake line 66 to supply combustion air and exhaust line 68 to exhaust combustion gases to the air or to vapor stripping conveyor 24.

Decontaminated material exits the bottom of vapor stripping conveyor 24 at chute 70.

Figure 2:
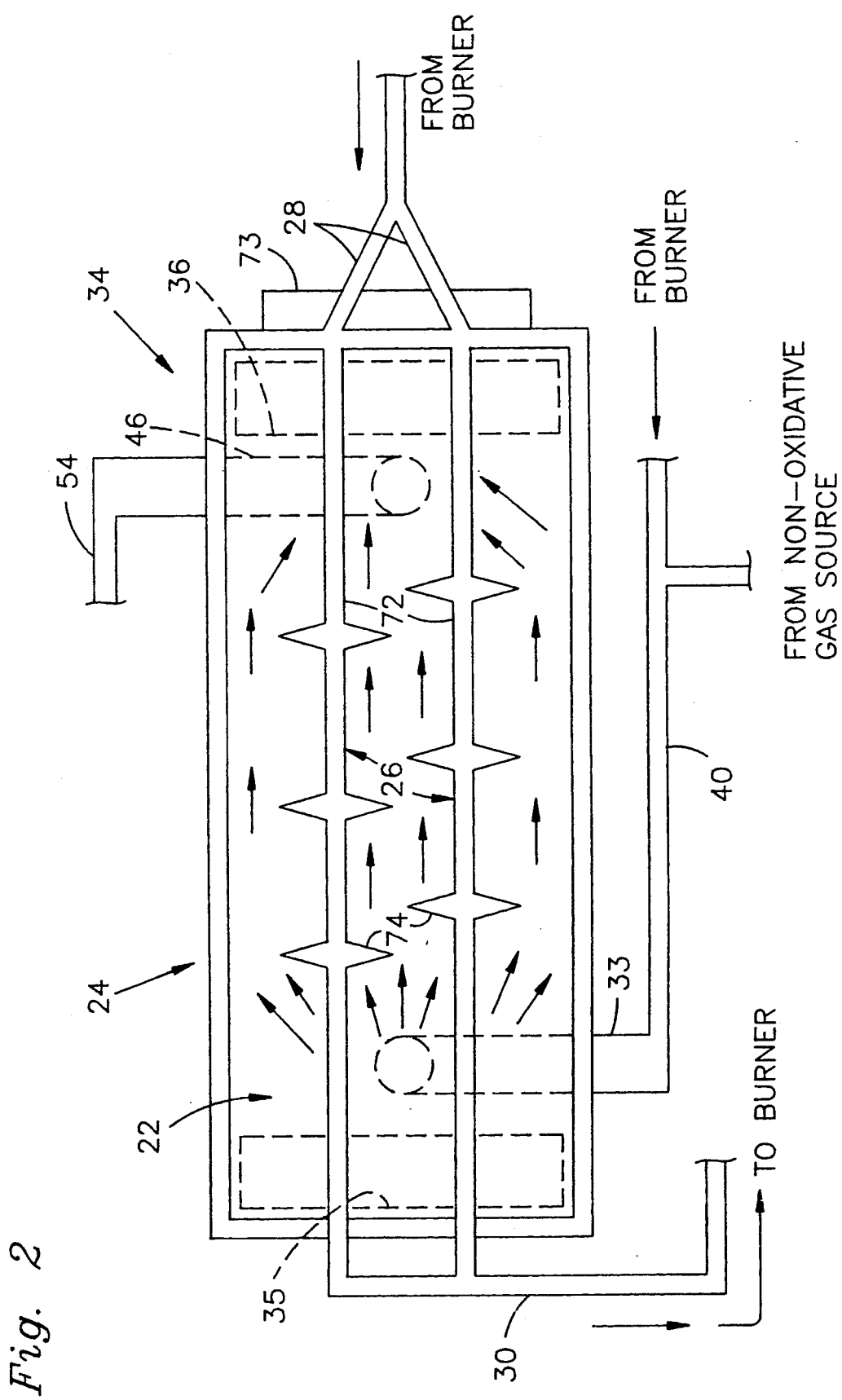
FIG. 2 shows a schematic top plan view of a vapor stripping material conveyor utilized in accordance with aspects of the invention.

FIG. 2 shows one preferred embodiment of a vapor stripping conveyor 24 which may be used to practice the invention. Vapor stripping conveyor 24 has non-oxidative gas feed line 33 connected on the top thereof as designated by dashed lines 34 and vapor exhaust line 46 connected on the top thereof on the other side as designated by dashed lines 46. Non-oxidative gas feed line 33 connects to non-oxidative gas supply line 40 (also shown in FIG. 1) and vapor exhaust line 46 connects to vapor exhaust manifold 54, also shown in FIG. 1.

The interior of vapor stripping conveyor 24 shows two stripping conveyors 26, which include hollow shafts 72 and hollow flights or fins 74. These conveyors are rotated by a motor and gear reducer 73 (shown schematically). The dashed lines 34 on front end 22 of vapor stripping conveyor 24 represent the entry point of sealed conveyor 20 from above, while the dashed lines 30 on the other end of vapor stripping conveyor 24 represent the exit point for the contaminated material flowing through chute 70.

Figure 3:
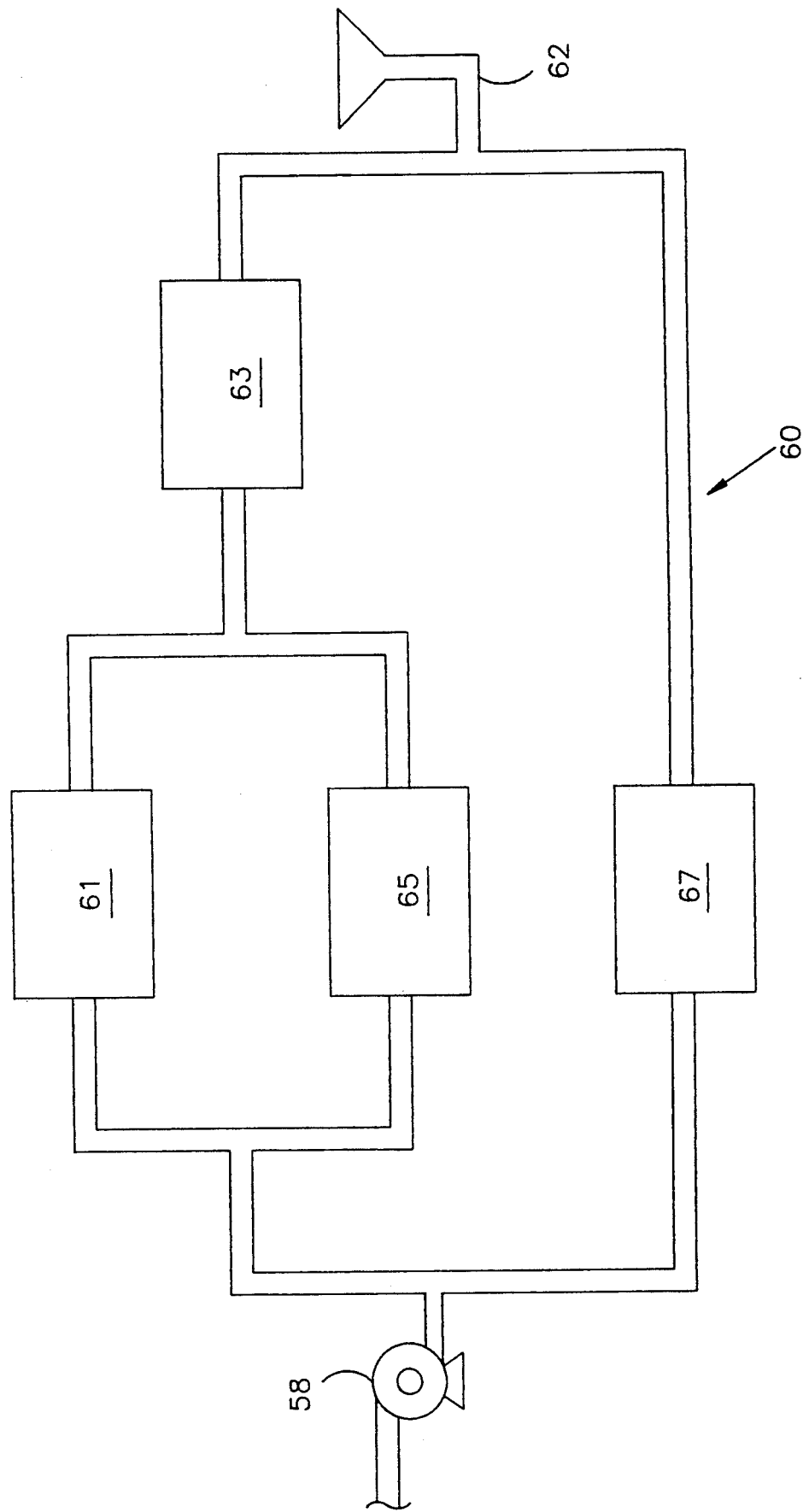
FIG. 3 is a schematic diagram showing preferred vapor treatment apparatus utilized in accordance with the invention.

FIG. 3 is an exploded representation of one preferred form of exhaust cleaner apparatus 60. The number 61 represents a burner for burning organics received from stripping conveyor 24 and vapor exhaust blower 58. Condenser and carbon absorber 67 connects to blower 58 and condenses some of the hazardous constituents. Catalytic thermal destructor 65 connects to blower 58 and receives exhaust gases from stripping conveyor 24. Wet scrubber 63 connects to burner 61 and catalytic thermal destructor 65 to further treat the exhausted gases.

Referring now to FIGS. 1-3 of the drawings, one preferred method of decontaminating soil will now be illustrated. As shown in FIG. 1, contaminated material is removed from its existing location by known conventional means, travels along removing conveyor 12 and enters into container 16. Feeder 18, which may be a pug mill, shredder, screen or the like, creates a seal between container 16 and sealed conveyor 20, accepts material from container 16 and then deposits it in sealed conveyor 20. Contaminated material travels through sealed conveyor 20 upwardly into hopper 23 and then into the front end 22 of vapor stripping conveyor 24. Contaminated material 14 spills downwardly through the top of vapor stripping conveyor 24 and engages stripping conveyors 26. Stripping conveyors 26 are rotated and cause contaminated material 14 to move along the length of vapor stripping conveyor 24.

Stripping conveyors 26 receive heated heat transfer fluid, such as air, oil, water, steam, eutectic salts, Dowtherm ®, gas and the like through hollow shafts 72 and optionally through flights 74. Heated heat transfer fluid is received from fluid supply line 28, which is heated in heater 32. The heated heat transfer fluid travels along hollow shafts 72 and exits vapor stripping conveyor 24 through fluid return line 30, which returns cooled heat transfer fluid to heater 32 for reheating. It is also possible for heat transfer fluid to be directed into the exterior walls and/or bottom of vapor stripping conveyor 24 if it is constructed to that capacity and if desired. This is especially true in the event conveyors, such as continuous belts or screens or the like, are substituted for rotating screw conveyors. Flowing heated heat transfer fluid through the exterior walls and/or bottom increases the heated surface exposed to the material, thereby enhancing vapor stripping in apparatus utilizing rotating screw conveyors and acting as the primary heat transfer vehicle in the case of alternate conveyors.

Contaminated material 14 travels through vapor stripping conveyor 24 and is heated as it progresses from one end to the other by absorbing heat from hollow shafts 72, flights 74 and optionally from the exterior walls and/or bottom of vapor stripping conveyor 24. Absorbed heat causes volatile and semivolatile hazardous organic contaminants contained within the material, as well as moisture contained in the material, to vaporize at points below their boiling temperatures. The combined vaporized organic compounds and water vapor travel upwardly into the open space within vapor stripping conveyor 24 above the material.

Because of the potentially toxic nature of the vaporized organic contaminants, it is necessary to ensure that all of the vaporized organics are carried away from vapor stripping conveyor 24. This has proven to be a difficult task for several reasons. One problem has been the need to ensure that vapor stripping conveyor 24 does not leak or permit fugitive toxic vapors to escape into the atmosphere. Another severe problem encountered is the tendency of the material to dry out upon heating. However, this tendency defeats the goal of driving out substantially all (such as 99.99%, for example) of the hazardous organic contaminants contained in the material. Often in prior art apparatus, a dry crust tends to form on the surface of the material due to rapid heating on outer portions thereof, which forms into a vapor impermeable capsule around inner portions of the material. This prevents proper heating of all of the material and results in trapped hazardous organics within the material, thereby defeating the decontamination objectives.

Yet another problem encountered in the prior art has been the extremely high flammability of many of the volatilized contaminants, especially under elevated temperatures. The danger of explosion has proven to be very real.

It has been surprisingly discovered that precise channeling of particular gases over the surface of the material surprisingly solves the problem of undue drying of the surface portion of the material, which permits substantially all of the hazardous organic contaminants within the material to volatilize and escape. Use of non-oxidative gas has also virtually eliminated the possibility of fire and/or explosion despite the presence of substantial quantities of vaporized, highly flammable organic compounds within the stripping conveyor. It has further been surprisingly discovered that the particular manner of channeling gases inside the conveyor prevents fugitive vapor emissions from vapor stripping conveyor 24.

To solve the problems outlined above, non-oxidative gases, such as nitrogen, argon, steam and carbon dioxide, for example, are channeled from a non-oxidative gas supply in a special precise manner into vapor stripping conveyor 24. As shown in FIG. 1, gases such as nitrogen, argon or carbon dioxide and the like may be supplied from an on site non-oxidative gas source 44, through non-oxidative gas supply blower 42, into branch 40b, through non-oxidative gas supply line 40 and into non-oxidative gas feed line 33. These gases are preferably supplied at temperatures greater than ambient. In the alternative, exhaust gases generated by heater 32 in heating fluids for passage through vapor stripping conveyor 24 may be channeled through branch 40a and into non-oxidative gas supply line 40.

As shown in FIG. 2, non-oxidative gases are swept into vapor stripping conveyor 24 through an opening in the top of the conveyor. The opening is introduced above the surface of the material. Non-oxidative gases are blown directly onto the top of the material beginning downstream of but directly adjacent to the introduction point of the material. Specifically, non-oxidative gas feed line 33 connects to vapor stripping conveyor 24 at a point immediately adjacent, but downstream of the entrance point of sealed material hopper 23 (designated by dashed lines 34). Vapor exhaust line 46 receives non-oxidative gas, contaminant vapors and moisture wherein they exit vapor stripping conveyor 24. Providing the precisely placed gas inlet at a point adjacent to but downstream of the introduction point of material into vapor stripping conveyor 24 to co-currently sweep vapors and moisture residing in the space above the material has proven to be an especially advantageous and effective way to remove vapors and moisture from the material as soon as the newly formed vapor emerges from the material.

It is also advantageous that the precisely introduced cocurrent sweep gases be introduced at a controlled temperature higher than the ambient temperature of the material entering the conveyor. For example, one preferred range includes those higher than the boiling point of water. Another especially preferred range includes temperatures greater than the boiling point of the volatile organic(s) to be removed. Higher than ambient temperature sweep gases provide enhanced vapor and moisture absorbance by the sweep gases. Utilization of greater than ambient temperature sweep gases ensures that the vapors do not have an opportunity to condense into liquid prior to being swept out of the vapor stripping conveyor. Condensation of vapors is to be avoided because it recontaminates previously cleaned material. Greater than ambient temperatures also ensure increased partial pressures of the vapors, which increases vapor absorbance. Another advantage of greater than ambient temperatures lies with reduced corrosion tendencies that normally result from acid-gas condensation at lower temperatures. Higher than ambient temperatures for the sweep gases still further increase the total thermal efficiency of the process.

After hazardous organic vapors and moisture exit vapor stripping conveyor 24, they travel through vapor exhaust line 46 and into vapor exhaust manifold 54. Vapor exhaust blower 58 conveys the mixture to vapor exhaust cleaner apparatus 60. Vapor exhaust cleaner apparatus 60 can be any decontamination apparatus well known in the art. For example, exhaust cleaner 60 may be capable of filtering to remove dust, scrubbing with wet scrubber 63 for removal of acid gases, burning the organics with burner 61, burning the organics with burner 61 followed by scrubbing with wet scrubber 63, absorbing a portion of the hazardous organics on activated carbon, catalytic thermal destruction with catalytic thermal destructor 65, recovering the hazardous organics by condensation or recovering by condensation followed by absorption on activated carbon. All of these cleaning apparatus, as well as others, are well known in the art and are not described in detail herein. Cleaned gases may be exhausted into the atmosphere without danger to the surrounding environment through exhaust purge conduit 62 or may be recycled to non-oxidative gas source 44 for reuse by way of exhaust purge recycle conduit 64.

It has surprisingly been discovered that excellent material decontamination may be achieved by supplying further non-oxidative gas into vapor stripping conveyor 124 at a point downstream of but directly adjacent to the point of introduction of the material. This is in contrast to introducing the non-oxidative gases into vapor stripping conveyor 24 at the same point of introduction of the material. Such introduction tends to unduly dry the material as previously described, thereby precluding complete removal of the contaminants. I have further discovered that introduction of non-oxidative gases into vapor stripping conveyor 24 at points downstream of but not adjacent to the introduction point of the material, such as mid-way along conveyor 24, does not achieve the desired amount of volatilization required to remove the contaminants from the material.

Removal of as much as 99.99%, or more, of volatile and semivolatile organic contaminants in various materials has been continuously achieved at high rates of treatment utilizing the apparatus and method of the invention claimed below.

The system 10 further contains various valves, dampers, gauges and the like that are not illustrated for the sake of simplicity and ease of understanding. They are employed in the usual manner to control or direct gases and/or fluids through the various conduits in the desired manner. Vapor stripping conveyor 24 has also been illustrated and described in a simplified manner for ease of understanding. For example, the number of flights 74 has been reduced below the number practically employed in use. Also, no specific means for rotating the flights has been shown. Although heating fluid entrances and exits for vapor stripping conveyor 24 have been illustrated as connecting at opposing ends, it should be understood that other constructions are possible, such as by use of standard, commercially available rotary joints. These design features are well known and may be commercially obtained in various forms and configurations. It should further be appreciated that conveying means other than rotating screens may be used to convey materials through vapor stripping conveyor 24.

Although this invention has been described with reference to specific forms selected for illustrations in the drawings, it will be appreciated that many modifications may be made, that certain steps may be performed independently of other steps, and that a wide variety of equivalent forms of apparatus may be utilized, all without departing from the spirit and scope of this invention, which is defined in the appended claims.

We claim:

1. A method for removing organic contaminants from contaminated material comprising:
    a) transporting and placing the contaminated material into a hopper, said hopper being substantially sealed from the atmosphere to prevent fugitive emissions of said contaminants from escaping into the atmosphere;
    b) conveying the material under sealed conditions into a heated vapor stripping conveyor;
    c) conveying the material under substantially sealed conditions along the vapor stripping conveyor to heat the material and thereby cause moisture in the material and the contaminants to be stripped from the material;
    d) streaming non-oxidizing gases at controlled temperature over the material, in the direction of travel of the material, beginning at a point downstream of and adjacent to the introduction point of the material into the vapor stripping conveyor to carry the contaminants and moisture away from the material; and
    e) maintaining the rate of flow and temperature of said gases to prevent undue surface drying of the material as the material passes through the conveyor.

2. The method defined in claim 1 further comprising removing and purifying said gases and discharging them to the atmosphere.

3. The method defined in claim 1 wherein the non-oxidizing gases are selected from the group consisting of nitrogen, steam, argon and carbon dioxide.

4. The method defined in claim 1 wherein said non-oxidizing gases are combustion gases.

5. The method defined in claim 1 wherein said non-oxidizing gases are maintained at less than atmospheric pressure in said vapor stripping conveyor.

6. The method defined in claim 1 further comprising intermixing the material as it passes through said vapor stripping conveyor.

7. Apparatus for removing organic contaminants from contaminated materials comprising:
    a) a hopper;
    b) means for sealing the hopper from atmospheric air;
    c) a heated vapor stripping conveyor sealed from atmospheric air to vapor strip the contaminants from the material;
    d) means for conveying material in sealed condition from the hopper to the vapor stripping conveyor;
    e) means for supplying non-oxidative gases at a controlled temperature to the vapor stripping conveyor;
    f) means for introducing the non-oxidative gases into the vapor stripping conveyor at a point downstream from the means for conveying the material into vapor stripping conveyor;
    g) means for removing the non-oxidative gases from the vapor stripping conveyor located to cause the non-oxidative gases to co-currently sweep over the material to convey contaminants stripped from the material out of the vapor stripping conveyor;
    h) means for controlling the flow rate and temperature of the non-oxidative gases as they flow through the vapor stripping conveyor and to prevent undue surface drying of the material as the material passes through the vapor stripping conveyor.

8. The apparatus defined in claim 7, further including conveyor means for returning the purified material to a desired location.

9. The apparatus defined in claim 7, further including means for removing and purifying the co-current sweep gases and discharging them to the atmosphere.

10. The apparatus defined in claim 9 wherein the purifying means comprises a burner for burning organics contained in said gases.

11. The apparatus defined in claim 10, comprising a wet scrubber downstream of said burner.

12. The apparatus defined in claim 9, wherein the purifying means comprises means for absorbing at least some of the hazardous constituents on activated carbon.

13. The apparatus defined in claim 9, further including means for recovering at least one of the hazardous constituents by condensation.

14. The apparatus defined in claim 9, wherein the purifying means comprises a wet scrubber for removal of acid gases from said gases.

15. The apparatus defined in claim 7, further including means for maintaining the flowing sweep gases at less than atmospheric pressure in said stripping conveyor.

16. The apparatus defined in claim 9, wherein the purifying means comprises means for catalytically thermally destructing the hazardous constituents.

* * * * *